United States Patent
Enomoto (10) Patent No.: US 8,005,005 B2
(45) Date of Patent: *Aug. 23, 2011

(54) METHOD, APPARATUS AND COMMUNICATION SYSTEM FOR ESTIMATING ON-OFF TRAFFIC CHARACTERISTIC AND RECORDING MEDIUM RECORDING PROGRAM FOR ESTIMATING ON-OFF TRAFFIC CHARACTERISTIC

(75) Inventor: Tadashi Enomoto, Tokyo (JP)

(73) Assignee: NEC Communication Systems, Ltd., Tokyo (JP)

( * ) Notice: Subject to any disclaimer, the term of this patent is extended or adjusted under 35 U.S.C. 154(b) by 199 days.

This patent is subject to a terminal disclaimer.

(21) Appl. No.: 12/392,892

(22) Filed: Feb. 25, 2009

(65) Prior Publication Data
US 2009/0213747 A1    Aug. 27, 2009

(30) Foreign Application Priority Data
Feb. 26, 2008 (JP) ................. 2008-044430

(51) Int. Cl.
*G01R 31/08* (2006.01)
(52) U.S. Cl. ..................................... 370/252
(58) Field of Classification Search .......... 370/253, 370/516, 252; 709/224
See application file for complete search history.

(56) References Cited

U.S. PATENT DOCUMENTS
2003/0048812 A1* 3/2003 Gross ........................ 370/516
2009/0116402 A1* 5/2009 Yamasaki ................... 370/253

FOREIGN PATENT DOCUMENTS
JP    2001285344 A    10/2001
JP    2005236909 A    9/2005

OTHER PUBLICATIONS
Kuang et al, The analysis on the cell loss of ABR traffic with on/off characteristics, 1998.*

* cited by examiner

*Primary Examiner* — Aung S Moe
*Assistant Examiner* — Vinncelas Louis (57) ABSTRACT

An ON-OFF traffic characteristic can be analyzed in real time from a measurement value without requiring detailed data analysis which is performed using measurement values accumulated for a predetermined time period through a high-performance measurement apparatus. A packet length and a packet transfer time interval of a communication traffic are first measured, and a data transfer rate variance indicator is computed based on a relative entropy value between the measured packet transfer time interval and a packet transfer time interval in case of transferring at a constant transfer rate. A predetermined traffic characteristic value is at least approximately computed using the computed data transfer rate variance indicator.

70 Claims, 7 Drawing Sheets

| ITEM | EQUATION/ANALYSIS | VALVE |
|---|---|---|
| VDTR | EQUATION 1 | 1.207 |
| Ton/Tc | ANALYSIS | 0.318 |
| exp(-VDTR) | EQUATION 2 | 0.299 |
| AVERAGE RATE (Rav) | ANALYSIS | 27.6 |
| AVERAGE RATE OF ON PERIOD | ANALYSIS | 86.6 |
| Rav·exp(VDTR) | EQUATION 3 | 92.1 |
| STANDARD DEVIATION/AVERAGE | ANALYSIS | 7.69 |
| N | ANALYSIS | 127.5 |
| (STANDARD DEVIATION/AVERAGE)2/(1-exp(-VDTR))2 | EQUATION 6 | 120.5 |
| MAXIMUM PACKET NUMBER (Ro=Rav) | ANALYSIS | 86.4 |
| (STANDARD DEVIATION/AVERAGE)**2/(1-exp(-VDTR)) | EQUATION 11 | 84.4 |

METHOD, APPARATUS AND COMMUNICATION SYSTEM FOR ESTIMATING ON-OFF TRAFFIC CHARACTERISTIC AND RECORDING MEDIUM RECORDING PROGRAM FOR ESTIMATING ON-OFF TRAFFIC CHARACTERISTIC

This application is based upon and claims the benefit of priority from Japanese patent application No. 2008-044430, filed on Feb. 26, 2008, the disclosure of which is incorporated herein in its entirety by reference.

BACKGROUND OF THE INVENTION

1. Field of the Invention

The invention relates to a method, apparatus and communication system for estimating an ON-OFF traffic characteristic used in quality evaluation of a packet data communication and a recording medium recording a program for estimating an ON-OFF traffic characteristic.

2. Description of Related Art

Generally, a packet loss ratio, a maximum value of a delay time, or a delay time variance is used as an indicator representing a service quality of a packet data communication network.

In high-speed data transfer such as real-time transfer of moving picture data, a data transfer rate mostly represents a pattern called an ON-OFF traffic in which a high-speed transfer period and a non-transfer period are repeated.

As a related art of the invention, there is a communication quality measuring apparatus which computes a network traffic measurement value at a predetermined time interval, computes a load index as a long-term measurement average value of the measurement value and a timing index as a moving average value of the measurement value, and performs control to generate or stop a test packet for communication quality measurement of an IP network according to the load index and the timing index (for example, see Japanese Patent Application Laid-Open No. 2005-236909).

As another related art of the invention, there is a technique in which a packet arrival to each session is modeled by a periodic on off process, and a packet in which a violation probability, which is a probability which will be delayed longer than a designated delay limit, is larger than a designated threshold is refused and not accepted by a server (for example, see Japanese Patent Application Laid-Open No. 2001-285344).

Next, problems of the related arts described above will be described.

In an ON-OFF traffic described above, compared to a traffic in which a data transfer rate is almost constant, even though an average data transfer rate is the same, a packet loss ratio becomes larger, and a delay time variance becomes larger. In addition, even in a communication with any other terminal which shares a resource of a network node, a packet loss ratio is increased and a delay time variance becomes larger. Accordingly, a network service quality deteriorates.

For this reason, in managing a network service quality, it is desirable to immediately estimate an ON-OFF traffic characteristic from a short-term real-time measurement value of a network traffic.

However, in order to analyze an ON-OFF traffic characteristic from a measurement value in real time, data analysis which accumulates measurement values for at least a predetermined time period and then performs large-scale computation through a high-performance measurement apparatus is necessary, whereby there is a problem in that the cost is increased even if it is realizable.

The techniques disclosed in JP-A Nos. 2005-236909 and 2001-285344 did not consider how to estimate an ON-OFF traffic characteristic from a short-term real time measurement value.

SUMMARY OF THE INVENTION

The invention is devised to resolve the above problems, and it is an exemplary object of the invention is to provide a method, apparatus and communication system for estimating an ON-OFF traffic characteristic and a recording medium recording a program for estimating an ON-OFF traffic characteristic in which an ON-OFF traffic characteristic is analyzed in real time from a measurement value without requiring detailed data analysis which is performed using measurement values accumulated for a predetermined time period through a high-performance measurement apparatus.

An exemplary aspect in accordance with the invention provides a method for estimating an ON-OFF traffic characteristic, which includes measuring a packet length and a packet transfer time interval of a communication traffic, computing a data transfer rate variance indicator based on a relative entropy value between the packet transfer time interval which is measured in the measuring the packet length and the packet transfer time interval and a packet transfer time interval in case of transferring at a constant transfer rate, and at least approximately computing a predetermined traffic characteristic value using the data transfer rate variance indicator which is computed in the computing the data transfer rate variance indicator.

An exemplary aspect in accordance with the invention also provides an apparatus for estimating an ON-OFF traffic characteristic, which includes a measurement section which measures a packet length and a packet transfer time interval of a communication traffic, a data transfer rate variance indicator computation section which computes a data transfer rate variance indicator based on a relative entropy value between the packet transfer time interval which is measured by the measurement section and a packet transfer time interval in case of transferring at a constant transfer rate, and a computation section which at least approximately computes a predetermined traffic characteristic value using the data transfer rate variance indicator which is computed by the data transfer rate variance indicator computation section.

An exemplary aspect in accordance with the invention also provides a communication system which includes the apparatus for estimating the ON-OFF traffic characteristic according to the invention which is connected between a packet transmitting device and a packet receiving device.

An exemplary aspect in accordance with the invention also provides a recording medium recording a program for estimating an ON-OFF traffic characteristic, for executing, in a computer, measurement processing which measures a packet length and a packet transfer time interval of a communication traffic, data transfer rate variance indicator computation processing which computes a data transfer rate variance indicator based on a relative entropy value between the packet transfer time interval which is measured by the measurement processing and a packet transfer time interval in case of transferring at a constant transfer rate, and computation processing which at least approximately computes a predetermined traffic characteristic value using the data transfer rate variance indicator which is computed by the data transfer rate variance indicator computation processing.

DESCRIPTION OF THE EXEMPLARY EMBODIMENTS

Hereinafter, an exemplary embodiment to which a method, apparatus and communication system for estimating an ON-OFF traffic characteristic and a program for estimating an ON-OFF traffic characteristic according to the invention are applied will be described in detail with the reference to the accompanying drawings.

First, the exemplary embodiment will be briefly described below.

Figure 1:
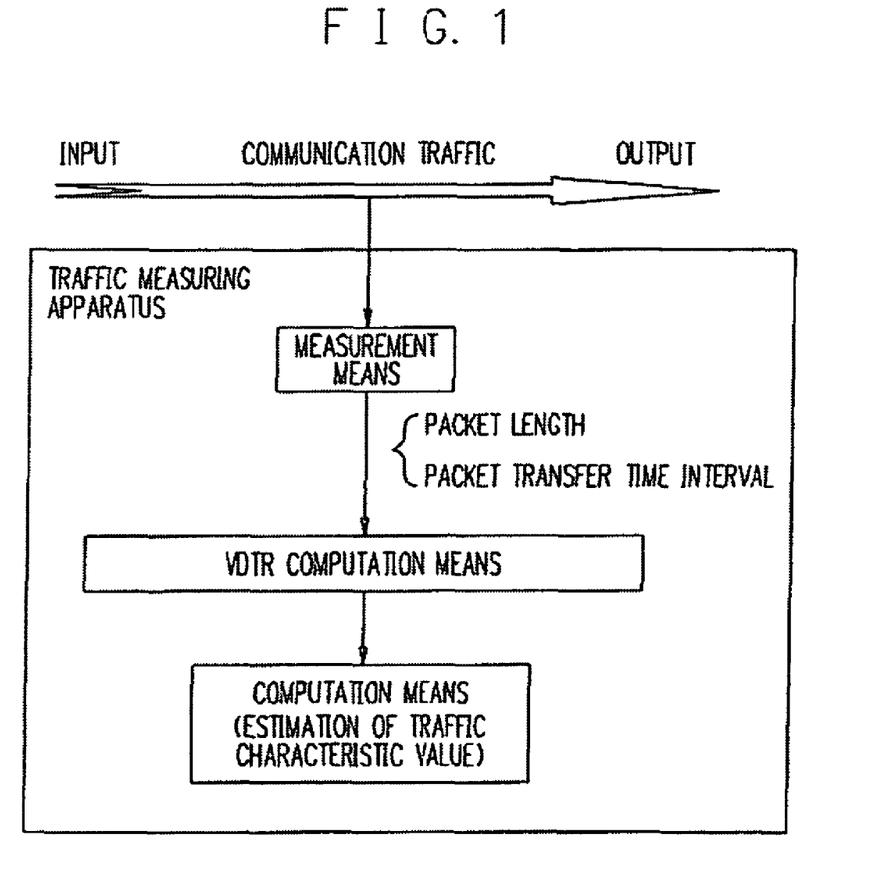
FIG. 1 is a schematic diagram illustrating an exemplary embodiment.

In an apparatus to which a method for estimating a traffic characteristic according to the exemplary embodiment is applied, as illustrated in FIG. 1, measurement means measures a packet length and a packet transfer time interval of a communication traffic. Data transfer rate variance indicator (hereinafter, referred to as simply "VDTR" (variance of data transfer rate)) computation means computes a VDTR using the measurement result. Computation means at least approximately computes and estimates various traffic characteristic values using a VDTR without requiring detailed data analysis which is performed using measurement values accumulated for a predetermined time period through a high-performance measurement apparatus.

Accordingly, a communication quality indicator of a packet data communication can be estimated in real time.

Next, an ON-OFF traffic according to the exemplary embodiment will be described.

In real-time transfer of moving picture data, a protocol which does not require an acknowledgement such as user datagram protocol (UDP) is used, and thus an ON-OFF traffic easily occurs.

In case where a protocol which requires an acknowledgement such as transmission control protocol (TCP) is used, a packet is transmitted when an acknowledgement is received from a receiving side. However, in case where a protocol which does not require an acknowledgement is used, a transmitting side transmits a packet while adjusting a transfer rate. For this reason, in case where a protocol which does not require an acknowledgement is used, an appropriate number of packets are transmitted at a basic cycle (hereinafter, referred to as "Tic") called tic of OS.

In case where a protocol which does not require an acknowledgement such as UDP is used, an application which is stopped is executed again based on Tic, and the application which is executed again transmits a packet. In a protocol which does not require an acknowledgement such as UDP, a packet is transmitted upon a transmission request from the application. That is, a packet is transmitted based on Tic.

In case where a protocol which requires an acknowledgement such as TCP is used, an occurrence of an ON-OFF traffic does not need to be considered since a packet is transmitted based on an acknowledgement which is regarded as randomly received. However, in case where a protocol which does not require an acknowledgement such as UDP is used, an ON-OFF traffic which uses Tic as a cycle can easily occur.

Let us assume that Tic is 10 ms and a data quantity of one packet is 1500 bytes. If one packet is transmitted at a Tic interval, a transfer rate is 1.2 Mbps. If about 30% of an interface of 100 Mbps or 1 Gbps is used as a load, 30 to 300 packets are transmitted at every one Tic.

Next, terms and assumptions which are used in the below description will be described.

In an ON-OFF traffic, an ON period represents a high-speed transmission period, and an OFF period represents a non-transmission period. Ton and Toff represent a time length of an ON period and a time length of an OFF period, respectively.

An ON rate, an OFF rate, and an average rate represent a packet transfer rate of an ON period, a packet transfer rate of an OFF period, and an average packet transfer rate, respectively, and Ron, Roff and Rav represent their values, respectively. A transfer rate of an OFF period is defined by a value obtained by dividing a packet length of a packet initially transmitted during an ON period by Toff.

An ON-OFF traffic mostly has a fixed cycle which has Tic as its value when generated by a generating apparatus, and a cycle of such a periodic ON-OFF traffic is called a cycle of an ON-OFF traffic. Tc denotes a value of the cycle.

Rout denotes an output rate of a queue model. $\Sigma L$ denotes a sum of packet lengths of all packets transmitted during one cycle, and Lav denotes an average of a packet length for one cycle.

The maximum number of packets which stay in a buffer of a queue model is referred to as simply a maximum packet number, and a data size sum of packets which stay in a buffer at that time is referred to as a required buffer amount.

"a**b" represents a to the power of b, and A≈B means that a value of A and a value of B are regarded as identical within a range of an approximation error.

As an assumption for approximation, N denotes the number of packets transmitted during a cycle Tc, where N is sufficiently larger than 1, that is, N>>1.

Values such as VDTR, Lav, and Rav computed using measured data are regarded as identical to values computed using data measured during one cycle Tc. This is effective when a measurement period is sufficiently longer than a cycle Tc. It is apparent in the fact that when $\Sigma L(i)$ and $\Sigma \Delta t(i)$ are represented by "K×($\Sigma L$ of one cycle)+a fraction" and "K×($\Sigma \Delta t$ of one cycle)+a fraction", respectively, and K is set to infinity, an extreme value is a value for one cycle.

In the below description, $\Sigma$ denotes a sum related to N packets during one cycle Tc.

Generally, in high-speed data transfer of moving picture data, a data transfer rate mostly represents a pattern called an ON-OFF traffic in which a high-speed transmission period and a non-transmission period are repeated. In an ON-OFF traffic, compared to a traffic in which a data transfer rate is almost constant, even though an average data transfer rate is the same, a packet loss ratio becomes larger, and a delay time variance becomes larger. In addition, even in a communication with any other terminal which shares a resource of a network, a packet loss ratio is increased and a delay time variance becomes larger. Accordingly, a network service quality deteriorates.

For this reason, in managing a network service quality, a suitable method is effective which estimates, in real time, an ON-OFF traffic characteristic, in particular a transfer rate of an On period, a ratio between an ON period and a cycle, the maximum number of packets which stay in a buffer and a data size sum of packets which stay in a buffer, from a short-term real time measurement value of a network traffic.

Therefore, in the exemplary embodiment, a packet length and a packet transfer time interval of a communication traffic are measured. Then, a VDTR, an average transfer rate, an average of a packet length, a standard deviation of a packet transfer time interval, and an average of a packet transfer time interval are obtained from the measurement values and used in analysis. A measured traffic is assumed as a periodic ON-OFF traffic which is identical in packet length, and, for example, a maximum queue length is at least approximately computed and estimated when a measured traffic passes through a queue in which an output rate is Ro.

Next, a VDTR which forms the basis of the present system will be described. A VDTR is obtained by Equation 1:

$$VDTR = \Sigma\{L(i)/(\Sigma L(k))\} \times ln[\{L(i)/(\Sigma L(k))\}/\{\Delta t(i)/(\Sigma \Delta t(k))\}] \quad \text{(Equation 1)}$$

Here, $\Sigma$ denotes a sum related to packets measured during a measurement period excluding a first packet, that is, a sum in which "i" of all packets measured during a period of from a measurement start to a measurement end is used as an index. Here, $\Sigma L(k)$ and $\Sigma \Delta t(k)$ are sums in which k of all packets measured during a period of from a measurement start to a measurement end is used as an index, and are regarded as constants since they do not include "i".

$ln(x)$ denotes a natural logarithm of "x", and $L(i)$ denotes a packet length of an i-th packet. $t(i)$ denotes a time when an i-th packet is transmitted. $\Delta t(i)$ denotes a packet transfer time interval $[t(i)-t(i-1)]$ between an i-th packet and an $(i-1)$-th packet.

A VDTR is suitable for real-time traffic analysis since a buffer amount required for computation is small and a computation quantity is not large.

A VDTR is also referred to as a relative entropy between two probability distributions $P(i)=L(i)/\Sigma L(k)$ and $Q(i)=\Delta t(i)/(\Sigma \Delta t(k))$ or a Kullback-Leibler divergence from Equation 1.

Next, features of a VDTR will be described.

<Feature 1> A VDTR is a relative entropy between $P(i)$ and $Q(i)$, and a relative entropy is generally used as a indicator which represents a difference between probability distributions of $P(i)$ and $Q(i)$. $P(i)=L(i)/\Sigma L(k)$ is a ratio of a packet length $L(i)$ of an i-th packet to a sum of data lengths of all packets, and $P(i)$ is proportional to $\Delta t(i)$ when a data transfer rate is constant. Namely, $P(i)$ is a probability distribution of $\Delta t(i)$ when a data transfer rate is constant. $Q(i)$ is a probability distribution of a measured $\Delta t(i)$. Namely, a VDTR is a quantity which represents a difference between a probability distribution of a measured packet transfer time interval and a probability distribution in which a data transfer rate is constant.

<Feature 2> A VDTR has a minimum value "0" when data transfer rates $DTR(i)$ of all packets are equal to an average data transfer rate.

Since a VDTR is a relative entropy between $P(i)$ and $Q(i)$, a VDTR has a minimum value if $P(i)=Q(i)$ for all indices i. $P(i)=Q(i)$ for all indices i can be expressed as $L(i)/\Delta t(i)=\Sigma L(k)/(\Sigma \Delta t(k))$. That is, a data transfer rate $DTR(i)$ of each i-th packet is equal to an average data transfer rate.

This can be understood from the fact that when only $t(i)$ among $t(0), t(1), \ldots, t(N)$ is changed, a partial differentiation $\partial VDTR/\partial t(i)=0$ is solved to be $DTR(i)=DTR(i+1)$.

<Feature 3> A VDTR is a downward convex continuous function.

Meaning of "downward convex" is as follows. Sequence data at two packet transfer time points are denoted by $\omega=(s(0), s(1), \ldots, s(N))$ and $\xi=(t(0), t(1), \ldots, t(N))$, and values of VDTRs thereof are set to $VDTR(\omega)$ and $VDTR(\xi)$. If a sequence data $[\alpha^*\omega+(1-\alpha)^*\xi]$ at a time point denotes a time sequence at a time point $(\alpha^*s(0)+(1-\alpha)^*t(0), \alpha^*s(1)+(1-\alpha)^*t(1), \ldots, \alpha^*s(N)+(1-\alpha)^*t(N))$, $[\alpha^*\omega+(1-\alpha)^*\xi]$ becomes an sequence data at effective packet transfer time point. A VDTR value $VDTR([\alpha^*\omega+(1-\alpha)^*\xi])$ of the time sequence data $[\alpha^*\omega+(1-\alpha)^*\xi]$ satisfies the following Equation. Here, $0<\alpha<1$, and $\omega$ and $\xi$ are not equal to each other.

$$VDTR([\alpha^*\omega+(1-\alpha)^*\xi]) > \alpha^* VDTR(\omega) + (1-\alpha)^* VDTR(\xi)$$

This can be understood from the fact that a value of double differentiation of $VDTR([\alpha^*\omega+(1-\alpha)^*\xi])$ with respect to $\alpha$ is positive.

<Feature 4> A VDTR is expressed by a dimensionless formula, and a value thereof is not changed even though a method of acquiring a unit of $L(i)$ or $t(i)$ is changed.

<Feature 5> In two traffics of which data transfer rate is varied at the same ratio, values of VDTRs are equal to each other.

For example, a value of a VDTR of a traffic of alternately transmitting a packet having a packet length of 500 bytes at a time interval of 10 ms and a time interval of 20 ms, a value of a VDTR of a traffic of alternately transmitting a packet having a packet length of 1,000 bytes at a time interval of 10 ms and a time interval of 20 ms, and a value of a VDTR of a traffic of alternately transmitting a packet having a packet length of 1,000 bytes at a time interval of 20 ms and a time interval of 40 ms are equal to each other. In addition, in case of these simple traffics, even though the number of samples is changed, values of VDTRs are not changed.

Next, a process of obtaining Equation 1 described above will be described.

Let us assume that a packet having a packet length of $(L(0), L(1), \ldots, L(N))$ is transferred at time points $(t(0), t(1), \ldots, t(N))$. A starting time point $t(0)$, an ending time point $t(N)$, and a packet length $L(i)$ are considered as given values, and a function $S(t(1), t(2), \ldots, t(N-1))$ having variables $t(1), t(2), \ldots, t(N-1)$ as parameters is considered as an indicator for representing a variance of a data transfer rate.

The function S needs to have an extreme value when a transfer rate is constant. Namely, an arriving time point $(t(1), \ldots, t(N-1))$ need to satisfy that the partial differentiation of the function S with respect to $t(i)$ is 0, that is, $\partial S/\partial t(i)=0$ in case of $DTR(i)=C$ (constant value) and for all indices i of $0<i<N$ in only the case.

Firstly, an indefinite integration of $DTR(i)$ with respect to $t(i)$, that is, $\int DTR(i)dt(i)$ is calculated.

$$\int DTR(i)dt(i)=L(i)^*ln(t(i)-t(i-1))+K(K \text{ is a constant})$$

By partially differentiating $\int DTR(i)dt(i)$ with respect to $t(i)$, $DTR(i)$ is obtained, and by partially differentiating $\int DTR(i+1)dt(i+1)$ with respect to $t(i)$, $-DTR(i+1)$ is obtained. For this reason, assuming that $S(t(1), t(2), \ldots, t(N-1))=A^*[\Sigma L(i)^*ln(t(i))]+B$ (A and B are contacts), the following result is obtained:

$$\partial S/\partial t(i)=A\{\partial[L(i)*ln(t(i)-t(i-1))]/\partial dt(i)-\partial[L(i+1)*ln(t(i+1)-t(i))]/\partial dt(i)\}=A\{DTR(i)-DTR(i+1)\}$$

Accordingly, $\partial S/\partial t(i)$ is 0 in case of DTR(i)=C (constant value) and for all indices i in only the case.

By configuring the constants A and B by using the constants L(i), $\Sigma L(i)(=\Sigma L(k))$, and $\Sigma \Delta t(i)=t(N)-t(0)(=\Sigma \Delta t(k))$ so that S can satisfy <Feature 3>, <Feature 4>, and <Feature 5>, Equation 1 is obtained.

Next, a procedure for estimating a maximum queue length, that is, a required buffer amount, of a queue model according to the exemplary embodiment will be briefly described.

First, on the assumption that a traffic is a periodic ON-OFF traffic, a ratio (Ton/Tc) between an ON period Ton and a cycle Tc and an ON rate are estimated using a VDTR and an average rate Rav.

Next, on the assumption that a traffic is a periodic ON-OFF traffic having a packet with a fixed length, the number N of packets of one cycle is estimated using a ratio (Ton/Tc) between an ON period and a cycle, a standard deviation of a packet transfer time interval $\Delta t(i)$ and an average of a packet transfer time interval $\Delta t(i)$.

A required buffer amount is represented using the number N of packets of one cycle, and is estimated using a VDTR, an average rate Rav, a ratio (standard deviation/average) between a standard deviation and an average of a packet transmission time interval, a packet length L, and an output rate Rout of a queue by applying the above-described result to N.

Finally, an estimation of a maximum packet length will be described.

Figure 2:
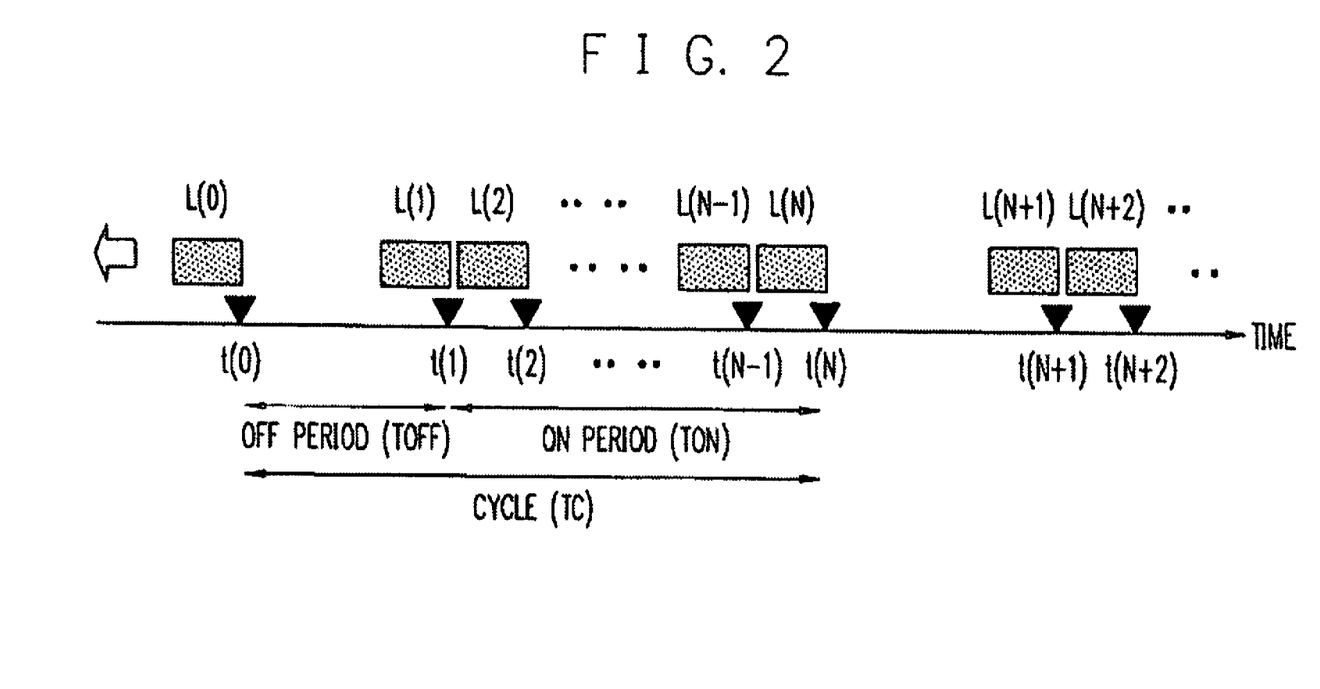
FIG. 2 is a view illustrating a packet arrival time point, an ON period and a cycle.
Figure 3:
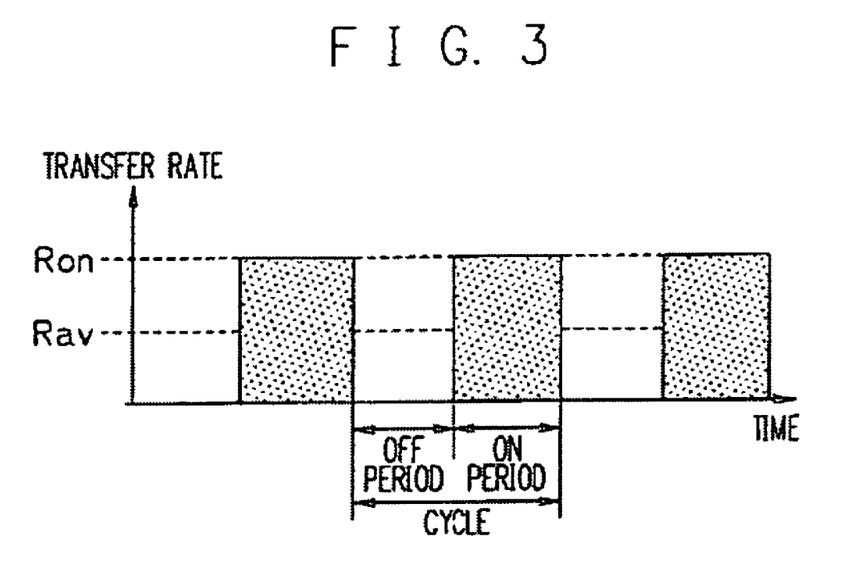
FIG. 3 is a view illustrating a relationship between an average transfer rate and an ON rate.
Figure 4:
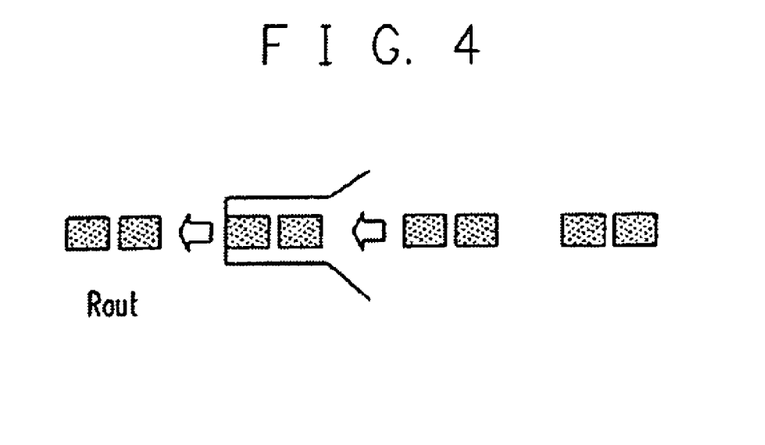
FIG. 4 is a view illustrating a queue and its input/output packet.

FIG. 2 illustrates a packet with a packet length of L(i) arriving at a time point t(i), and a relationship between an ON period and a cycle. FIG. 3 illustrates an ON rate (Ron), an average transfer rate (Rav), and a relationship between an ON period and a cycle. FIG. 4 illustrates a situation in which an ON-OFF traffic in which an average transfer rate is Rav arrives at a queue and is output at an output rate Rout.

The estimating procedure briefly described above will be described in sequence using various equations.

In a periodic ON-OFF traffic in which a value of an average transfer rate is Rav and a value of a data transfer rate variance indicator is VDTR, an approximation value of a ratio (Ton/Tc) between an ON period and a cycle is obtained by Equation 2 using an exponential function exp(x) of the Napierian number e.

$$\text{ON period/cycle}=Ton/Tc \approx \exp(-VDTR) \quad \text{(Equation 2)}$$

An ON rate (Ron) is obtained by Equation 3 using Equation 2.

$$Ron \approx Rav \times \exp(VDTR) \quad \text{(Equation 3)}$$

Next, when a period traffic in which an average transfer rate is Rav is input to a queue model of FIG. 4 in which an output rate is Rout, an approximation value of a required buffer amount is obtained by Equation 4. Here, Rout has a value of a range which is larger than Rav and does not make a value of Equation 4 negative.

$$\text{Required buffer amount} \approx (\Sigma L)*[1-(Rout/Rav) \times (Ton/Tc)] \quad \text{(Equation 4)}$$

Next, in case of a periodic ON-OFF traffic in which a packet length is constant, the number N of packets transmitted during one cycle is expressed by Equation 5 using a standard deviation and an average of a packet transfer time interval $\Delta t(i)$, and a ratio (Ton/Tc) between an ON period and a cycle.

$$N \approx \{(\text{standard deviation/average})2\}/\{(1-Ton/Tc)2\} \quad \text{(Equation 5)}$$

Equation 6 can be derived using Equation 2 and Equation 5.

$$N \approx \{(\text{standard deviation/average})2\}/\{(1-\exp(-VDTR))2\} \quad \text{(Equation 6)}$$

Since $\Sigma L = N*L$, when a periodic ON-OFF traffic in which a packet length is constant is input to a queue model of FIG. 4 in which an output rate is Rout, an approximation value of a required buffer amount can be estimated by Equation 7 using an average transfer rate (Rav), a VDTR, a standard deviation and an average of a packet transfer time interval $\Delta t(i)$, and an output rate (Rout) of a queue.

$$\text{Required buffer amount} \approx L \times \{(\text{standard deviation/average})2\}/\{(1-\exp(-VDTR))2\} \times \{1-(Rout/Rav) \times \exp(-VDTR)\} \quad \text{(Equation 7)}$$

Here, since a value does not change even though a fixed packet length is replaced with an average of a packet length, Equation 8 can be obtained by replacing L of Equation 7 with an average of a packet length Lav.

$$\text{Required buffer amount} \approx Lav \times \{(\text{standard deviation/average})2\}/\{(1-\exp(-VDTR))2\} \times \{1-(Rout/Rav) \times \exp(-VDTR)\} \quad \text{(Equation 8)}$$

Equations 7 and 8 do not change in value on the assumption that a traffic has a packet with a fixed length, but Equation 8 is better because of the following two points. A first is that Lav can be computed without an assumption of a fixed length. A second is that an average of a packet length can be easily computed compared to one which obtains a value of a fixed packet length by actually analyzing measured data and confirming a fixed packet length.

Next, Equations 2 to 5 will be described in detail.
Since N>>1, $$Ron=(\Sigma L-L(1))/[t(N)-t(1)] \approx \Sigma L/[t(N)-t(1)]=\Sigma L/Ton,$$

and $$\Sigma L \approx Rav \times Tc \approx Ron \times Ton$$

$$Ton/Tc \approx Rav/Ron$$

If Equation 2 is approximated on the assumption of N>>1, $$VDTR=\Sigma(L(i)/(\Sigma L(k))) \times ln((L(i)/(\Sigma L(k)))/(\Delta t(i)/(\Sigma \Delta t(k))))=\Sigma(L(i)/\Sigma L) \times ln((L(i)/\Delta t(i))/(\Sigma L/(\Sigma \Delta t(k))))$$

Since $Rav=\Sigma L/\Sigma \Delta t(k)$, $$VDTR=\Sigma(L(i)/\Sigma L) \times [ln(L(i)/\Delta t(i))-ln(Rav)]=\Sigma(L(i)/\Sigma L) \times ln(L(i)/\Delta t(i))-ln(Rav)$$

Since $L(i)/\Delta t(i)=Ron$ when $i=2, \ldots, N$, $$VDTR=(L(1)/\Sigma L) \times ln(L(1)/\Delta t(1))+\{(\Sigma L-L(1))/\Sigma L\} \times ln(Ron)-ln(Rav)=(L(1)/\Sigma L) \times ln(L(1)/\Delta t(1))+(1-L(1)/\Sigma L) \times ln(Ron)-ln(Rav)$$

Since N>>1, $$(L(1)/\Sigma L) \times [ln(L(1)/\Delta t(1)) \approx 0$$

and $$(1-L(1)/\Sigma L) \times ln(Ron) \approx ln(Ron),$$

so that $$VDTR \approx ln(Ron)-ln(Rav)$$

Accordingly, $$\exp(-VDTR) \approx Rav/Ron \approx Ton/Tc$$

Equation 2 is derived, and $Ron \approx Rav \times \exp(VDTR)$ is also derived.

Next, Equation 4 will be described.

In view of a time stream, a data length sum of packets which stay in a buffer of a queue is 0 at a time point immediately before t=t(1), is L(1) at t=t(1) which is a first time point of an ON period, and is then continuously increased and becomes maximum at t=t(N) in the boundary between an ON period and an OFF period. Thereafter, an OFF period starts, so that a data length sum is gradually reduced since a packet does not arrive. Finally, a data length sum becomes 0 again at a time point immediately before t=t(N+1) since Rout>Rav.

A required buffer amount can be obtained using a difference between an input amount and an output amount of a queue. A data amount of L(1) arrives at a queue at t=t(1), and then a packet amount of ΣL−L(1) arrives by a time point of t=t(N), so that total ΣL is input. Meanwhile, an output amount during this time period is Rout×Ton, and thus a required buffer amount can be approximated as follows.

$$\text{Required buffer amount} \approx \Sigma L - Rout \times Ton$$

$$\approx \Sigma L \times \left\{1 - \frac{(Rout \times Ton)}{\Sigma L}\right\}$$

$$= \Sigma L \times \left\{1 - \frac{(Rout \times Ton)}{(Tc \times Rav)}\right\}$$

$$= \Sigma L \times \left\{1 - \left(\frac{Rout}{Rav}\right) \times \left(\frac{Ton}{Tc}\right)\right\}$$

As described above, it can be understood that Equation 4 is derived.

Next, Equation 5 will be described.

A packet transfer time interval of an ON period is represented by ΔTon, a packet transfer time interval of an OFF period is represented by ΔToff, and an average packet transfer time interval is represented by ΔTav.

A packet transfer time interval of an ON period ΔTon is as follows:

$$\Delta Ton = ON\ period/(N-1) \approx Ton/N$$

An average packet transfer time interval ΔTav is Tc/N, that is, ΔTav=Tc/N.

A packet transfer time interval ΔToff of an OFF period is identical to an OFF period Toff, and thus $$\Delta Toff = Toff$$
$$= Tc - Ton$$
$$= N \times \Delta Tav - (N-1) \times \Delta Ton$$
$$\approx N \times (\Delta Tav - \Delta Ton)$$

Also, $\frac{\Delta Ton}{\Delta Tav} \approx \frac{\left(\frac{Ton}{N}\right)}{\left(\frac{Tc}{N}\right)} = \frac{Ton}{Tc}$ As a result, variance of a packet arrival time interval is obtained by the following approximate equation.

$$\text{Variance} = \frac{\{(N-1) \times \Delta Ton2 + \Delta Toff2\}}{N} - \Delta Tav**2$$

$$\approx \frac{(N-1)}{N} \times (\Delta Ton2) + N \times (\Delta Tav - \Delta Ton)2 - \Delta Tav**2$$

$$\approx \Delta Ton2 + N \times (\Delta Tav - \Delta Ton)2 - \Delta Tav**2$$

$$= (\Delta Tav - \Delta Ton)\{N \times (\Delta Tav - \Delta Ton) - (\Delta Tav + \Delta Ton)\}$$

If N ≫ 1, $$\frac{(\Delta Tav + \Delta Ton)}{(\Delta Tav - \Delta Ton)} = \frac{\left(\frac{Tc}{N} + \frac{Ton}{N}\right)}{\left(\frac{Tc}{N} - \frac{Ton}{N}\right)}$$

$$= \frac{(Tc + Ton)}{Toff},$$

and since it is an order number close to 1 in case of an ON-OFF traffic, $$\text{Variance} \approx N \times (\Delta Tav - \Delta Ton)**2$$

$$\approx N \times (\Delta Tav2) \times \left\{\left(1 - \frac{\Delta Ton}{\Delta Tav}\right)2\right\}$$

$$\approx N \times (\Delta Tav2) \times \left\{\left(1 - \frac{Ton}{Tc}\right)2\right\}$$

Therefore, the second power of a value obtained by dividing a standard deviation of a packet arrival time interval by an average is obtained by the following approximate equation, and Equation 5 is derived.

(standard deviation/average)2=variance/(average2)≈N×{(1−Ton/Tc)**2}

Hereinbefore, up to Equation 8 is described. Next, how to treat an output rate Rout which is a parameter and an equation having no effective dimension in a comparison with a value computed using a different unit will be described.

Equation 9 described below represents an extreme value when an output rate (Rout) is approximated to an average transfer rate (Rav) from a positive direction in Equation 8 for estimating a required buffer amount of an obtained queue model. Since an output rate (Rout) is not used, it is effective in case of comparing required buffer amounts of a periodic ON-OFF traffic having two fixed length packets and having a different average transfer rate (Rav).

Required buffer amount (Rav)≈Lav×{(standard deviation/average)**2}/{1−exp(−VDTR)}    (Equation 9)

A value obtained by dividing a required buffer amount by a packet length is advantageous in the fact that it is an equation having no dimension. It is effective when comparing a periodic ON-OFF traffic which includes two fixed length packets having different packet lengths. Equation 10 is obtained by dividing both sides of Equations 8 and 9 by an average of a packet length Lav.

Maximum packet number {(standard deviation/average)2}/{(1−exp(−VDTR))2}×{1−(Rout/Rav)×exp(−VDTR)}    (Equation 10)

Maximum packet number (Rav)≈{(standard deviation/average)**2}/{1−exp(−VDTR)}    (Equation 11)

Next, an apparatus (for example, router) for implementing the estimating method according to the exemplary embodiment described above will be described in detail with reference to the accompanying drawings.

Figure 5:
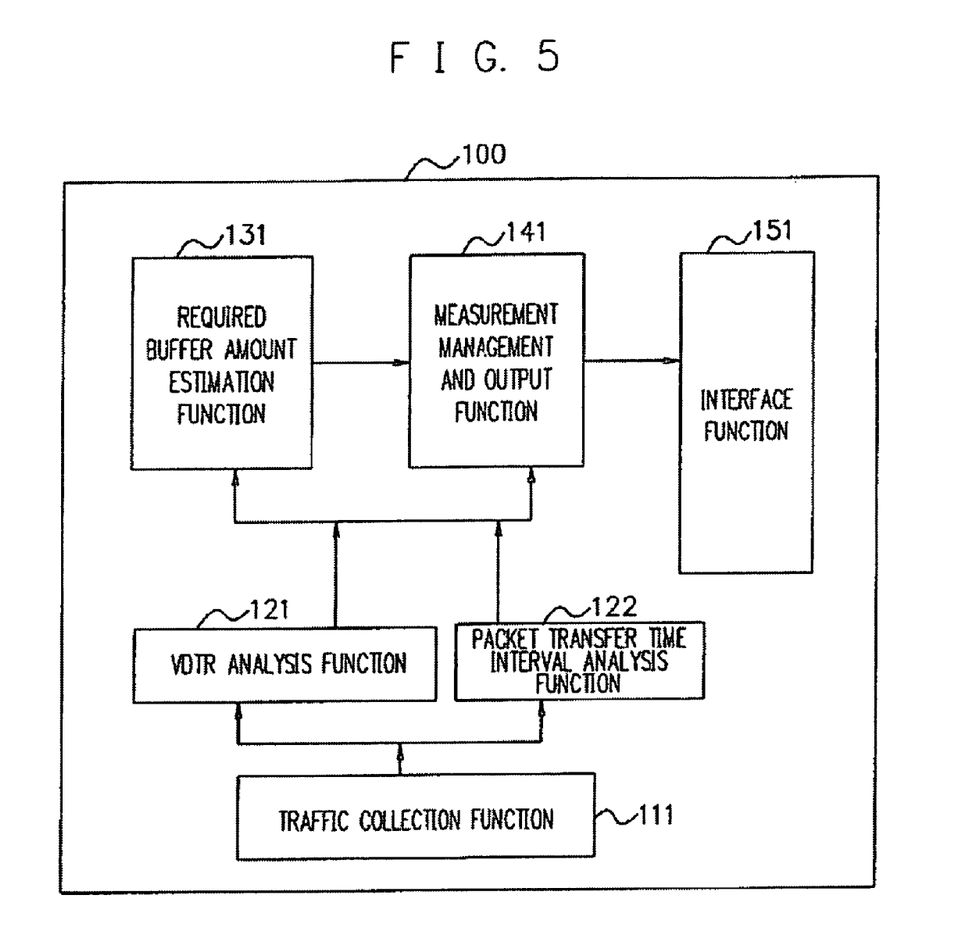
FIG. 5 is a view illustrating a configuration a traffic measuring apparatus according to the exemplary embodiment.

FIG. 5 illustrates a configuration of a traffic measuring apparatus 100. A traffic estimation apparatus 100 includes a traffic collection function 111, a VDTR analysis function 121, a packet transfer time interval analysis function 122, a required buffer amount estimation function 131, a measurement management and output function 141, and an interface function 151.

Figure 6:
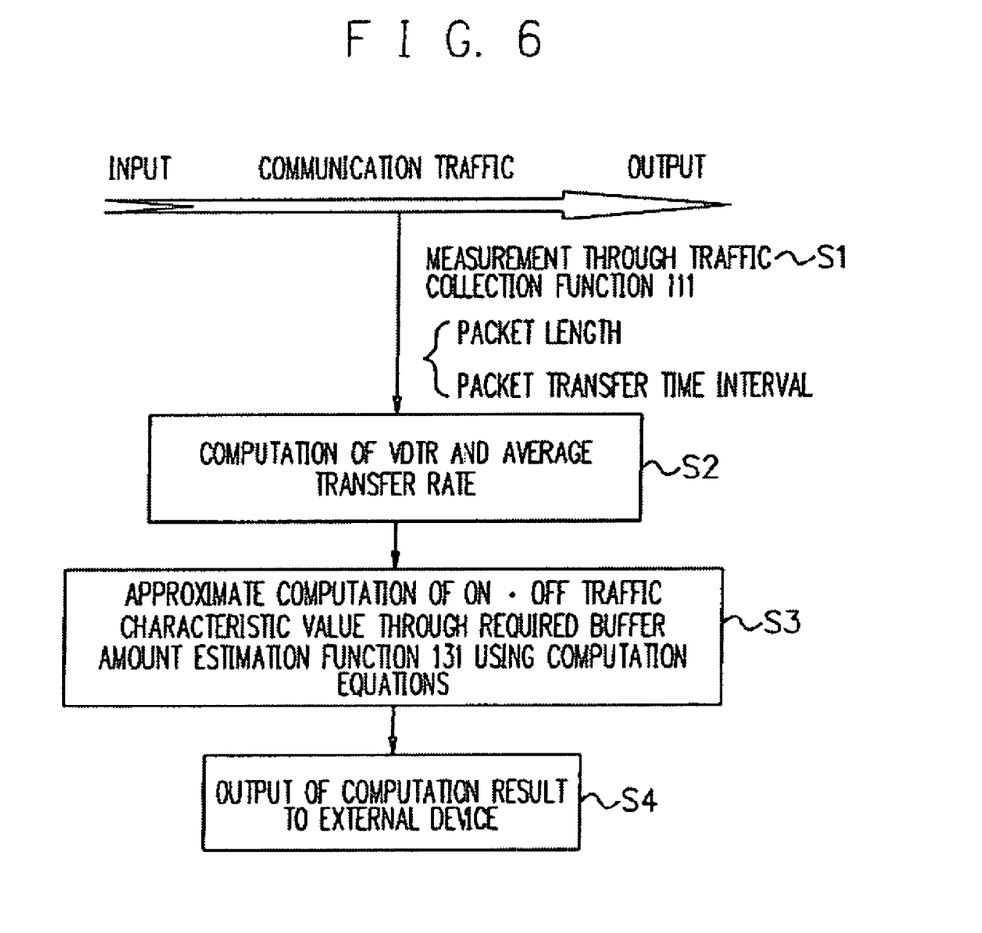
FIG. 6 is a view illustrating operation for estimating a traffic characteristic value according to the exemplary embodiment.

Next, operation according to the exemplary embodiment will be described in detail with reference to FIG. 6.

The traffic collection function (measurement means) 111 collects a communication traffic of a measurement target, and transfers collected data to the VDTR analysis function 121 and the packet transfer time interval analysis function 122. Information transferred to the VDTR analysis function 121 and the packet transfer time interval analysis function 122 from the traffic collection function 111 includes measurement result data such as a transfer time or a packet length of each packet (step S1).

The VDTR analysis function 121 computes a VDTR and an average transfer rate using Equation 1 (step S2), and transfers information including the computed VDTR and the computed average transfer rate to the required buffer amount estimation function 131 and the measurement management and output function 141.

The packet transfer time interval analysis function 122 analyzes a packet transfer time interval and transfers an average and a standard deviation of the packet transfer time interval and an average of a packet length to the required buffer amount estimation function 131 and the measurement management and output function 141.

The required buffer amount estimation function 131 receives, as an input, a value of a VDTR and average transfer rate information which are obtained from the VDTR analysis function 121, and an average and a standard deviation of the packet transfer time interval and an average of a packet length which are obtained from the packet transfer time interval analysis function 122.

The required buffer amount estimation function 131 computes a ratio between an ON period and a cycle using Equation 2 and computes an ON rate using Equation 3, based on the input information. The number of packets of an ON period is computed using Equation 6. A required buffer amount with respect to a plurality of output bands Rout which are previously given is computed using Equation 8. A required buffer amount when an output band is set to Rav is computed using Equation 9. The maximum packet number with respect to a plurality of output bands Rout which are previously given is computed using Equation 10. The maximum packet number when an output band is set to Rav is computed using Equation 11 (step S3).

The required buffer amount estimation function 131 transfers the computation results to the measurement management and output function 141.

The measurement management and output function 141 synthesizes information input from the VDTR analysis function 121, the packet transfer time interval analysis function 122, and the required buffer amount estimation function 131 and externally outputs them through the interface function 151 (step S4).

Figure 7:
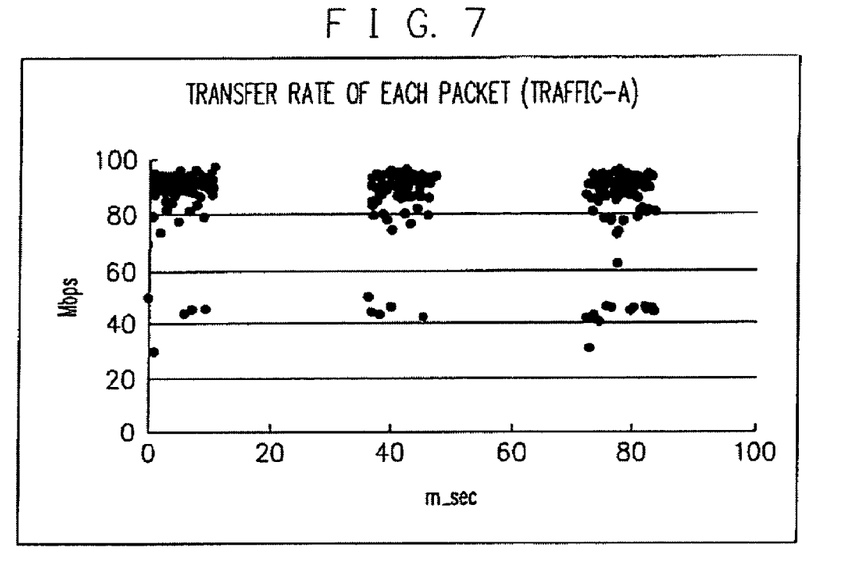
FIG. 7 is a view illustrating a transfer rate of each packet plotted using an output traffic of a certain application.

FIG. 7 illustrates a transfer rate of each packet plotted using an output traffic of a certain application. A horizontal axis denotes a time, and a vertical axis denotes a transfer rate (Mbps).

Figure 8:
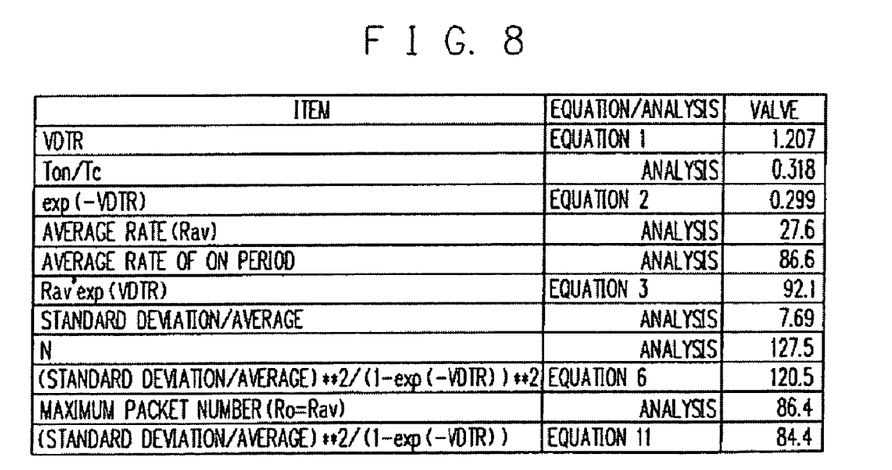
FIG. 8 is a view illustrating an analysis result value and a computation value obtained by using an output traffic of a certain traffic.

FIG. 8 illustrates values analyzed using a measurement traffic used in drawing up FIG. 7 and values computed using equations such as Equations 6 and 11. Like a computation value of the number N of packets during one cycle by Equation 6 and a computation value of the maximum packet number by Equation 11, a computation value by an equation almost matches with a result based on an analysis.

Figure 9:
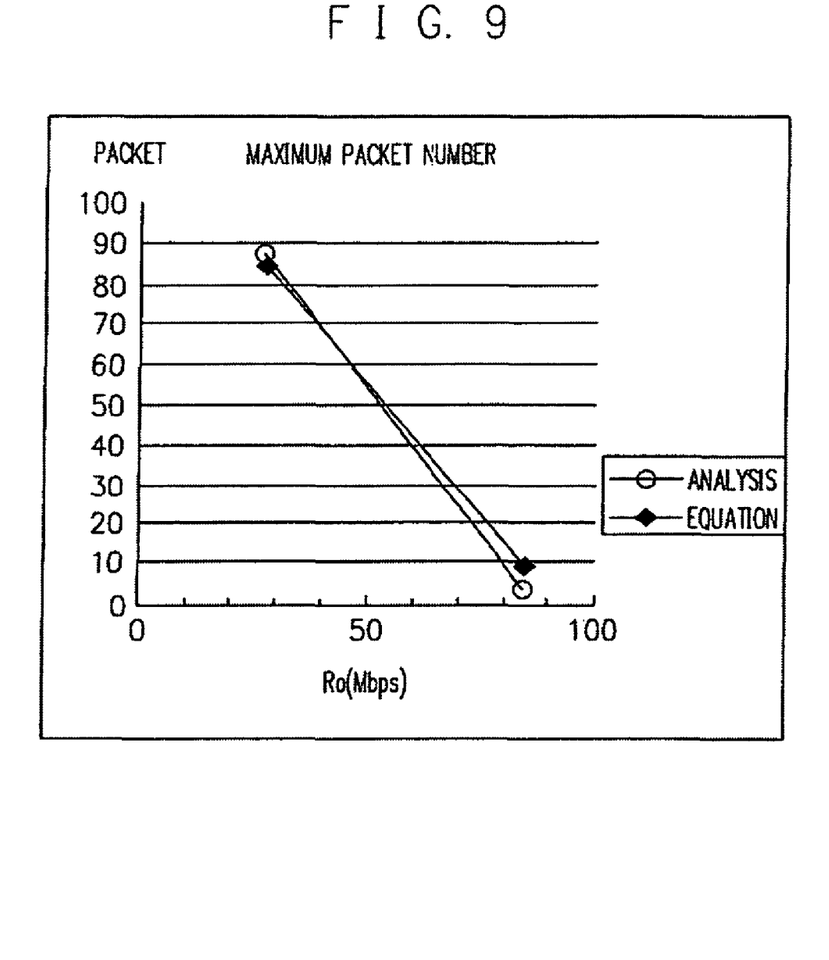
FIG. 9 is a view illustrating an analysis result value and a computation value of the maximum packet number obtained by using an output traffic of a certain application.

FIG. 9 is a graph illustrating two values plotted using Equation 10 in case of Ro=Rav and Ro=85 Mbps. An estimation of the maximum packet number using Equation 11 almost matches with an analysis result of a measurement value.

An example to which the exemplary embodiment is applied will be described below. Here, considered is a network node having an output queuing buffer such as a router in which an input line is 100 Mbps and an output line is 30 Mbps when Rav is an ON-OFF traffic of 30 Mbps.

In such a network, preferably, a queue of FIG. 4 by an ON-OFF traffic is increased when an ON period starts and becomes a maximum value at an end of an ON period, and thereafter is decreased and becomes 0 at an end of an OFF period. In this case, since an ON period starts at once, a queue starts to increase and forms a saw-tooth wave of 0→(increment)→maximum value→(decrement)→0→(increment)→maximum value→ . . . .

When 40 ON-OFF traffics of which an average rate is 1 Mbps and 20 ON-OFF traffics of which an average rate is 2 Mbps are input to a port of a router in which an input and an output are 100 Mbps, respectively, a maximum value (required buffer amount) of a buffer in a router which a traffic of 1 Mbps uses is estimated as follows.

(1) A band of an output line is divided by an average rate. Since an input sum is 80 Mbps, an output band allocated to a traffic of 1 Mbps is (1 Mbps/80 Mbps)×100 Mbps=1.25 Mbps (2) An average of a packet length, a VDTR, and an average and a standard deviation of Δt are measured and estimated by Equation 8 using Rout=1.25 Mbps. In the same way, when a sum of input traffics is about 100 Mbps, a maximum buffer amount which a certain traffic uses can be estimated using Equation 9.

As described above, according to the exemplary embodiment, an ON-OFF traffic characteristic can be determined using a necessary buffer amount, and how a buffer of a router is used for the traffic can be estimated.

As described above, according to the above-described exemplary embodiment, the following effects can be obtained.

As a first effect, without needing to accumulate a measurement value during a predetermined time period and perform large-scale computation through a high-performance measurement apparatus, a characteristic of a periodic ON-OFF traffic such as a ratio between an ON period and a cycle or a rate of an ON period can be at least approximately computed and estimated from a short-term real-time measurement value.

As a second effect, when a traffic is a periodic ON-OFF traffic and a packet length is constant, by simultaneously measuring an average and a distribution of a packet transfer time interval, without needing to accumulate a measurement value during a predetermined time period and perform large-scale computation, the maximum packet number or a required buffer amount of a queue model can be at least approximately computed and estimated, in addition to the first effect.

As described above, according to the above-described exemplary embodiment, a characteristic of an ON-OFF traffic such as a transfer rate (an ON rate) of an ON period, a ratio between an ON period and a cycle, the maximum number of packets staying in a buffer, and a data size sum of packets which stay in a buffer can be estimated in real time immediately from a short-term real-time measurement value. Therefore, without requiring detailed data analysis performed using a measurement value accumulated during a predetermined time period through a high-performance measurement apparatus, a traffic with a large VDTR can be analyzed in real time, and an analysis result can be displayed on a screen. Therefore, a network operator can immediately determine a QoS deterioration degree caused by a certain ON-OFF traffic.

Figure 10:
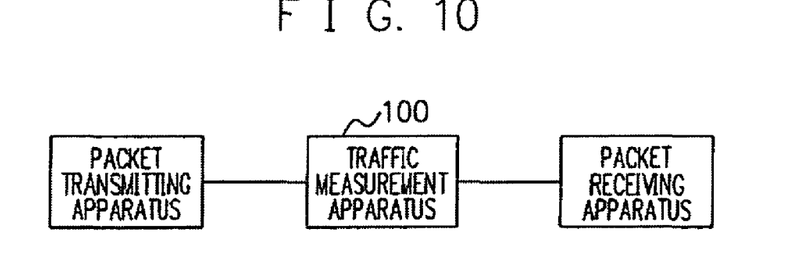
FIG. 10 is a view illustrating a configuration of a communication system having a traffic measuring apparatus according to the exemplary embodiment.

Also, as illustrated in FIG. 10, by configuring a communication system in which the traffic measurement apparatus 100 according to the exemplary embodiment is connected between a packet transmitting apparatus and a packet receiving apparatus, a characteristic of an ON-OFF traffic in the communication system can be estimated in real time. Therefore, as described above, a communication system in which a network operator can immediately determine a QoS deterioration degree can be realized without requiring large-scale computation through a high-performance measurement apparatus.

Input data of the traffic collection function 111 is not limited to one which is described above if a measurement target traffic can be collected, and information obtained by directly measuring data transmitted through a network transmission medium may be used as the input data. Also, information from a line interface apparatus of an apparatus which configures a network such as a router may be used. Also, information transmitted through a network from an apparatus which captures and directly measures data transmitted through a network transmission medium may be used. Also, information transmitted through a network from a line interface apparatus of an apparatus which configures a network such as a router which is installed at a remote site may be used. Information which was measured in the past and stored in a storage medium and is then read out of the storage medium may be used.

Also, the traffic collection function 111 may include a filter function which analyzes information of a packet, and collects only a packet of a certain source address or only a packet of a certain kind of a certain destination address.

Output information may be displayed on a display of a corresponding device through the interface function 151 or may be transmitted to any other measurement apparatus or network management system through a network.

A procedure for implementing the method for estimating a characteristic of an ON-OFF traffic according to the above-described exemplary embodiment can be recorded as a program on a recording medium, and thus, the above-described functions according to the exemplary embodiments of the invention can be executed by a CPU of a computer constituting a system according to the program provided from the recording medium. The invention can be applied to even a case where an information group including a program is provided from the recording medium or an external recording medium through a network to an output apparatus.

In other words, program codes read out from the recording medium are an implementation of novel functions of the invention, and the recording medium storing the program codes and signals read out from the recording medium also belong to the scope of the invention. A flexible disk, a hard disk, an optical disk, an optical magnetic disk, a CD-ROM, a CD-R, a CD-RW, a DVD-ROM, a DVD-RAM, a DVD-RW, a DVD+RW, a magnetic tape, a non-volatile memory card, and a ROM may be used as the recording medium.

According to the recording medium recording the program of the invention, the functions according to the exemplary embodiment of the invention can be implemented in a computer of each kind of network node controlled by the recorded program.

As described above, according to the invention, a characteristic of an ON-OFF traffic can be analyzed in real time from a measurement value without requiring detailed data analysis performed using a measurement value accumulated during a predetermined time period through a high-performance measurement apparatus.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A method for estimating an ON-OFF traffic characteristic, comprising:
measuring a packet length and a packet transfer time interval of a communication traffic;
computing a data transfer rate variance indicator based on a relative entropy value between the packet transfer time interval which is measured in the measuring the packet length and the packet transfer time interval and the packet transfer time interval in case of transferring at a constant transfer rate; and
at least approximately computing a predetermined traffic characteristic value using the data transfer rate variance indicator which is computed in the computing the data transfer rate variance indicator,
wherein the data transfer rate variance indicator is obtained by the following equation:

$$VDTR = \Sigma\{L(i)/(\Sigma L(k))\} \times ln[\{L(i)/(\Sigma L(k))\}/\{\Delta t(i)/(\Sigma \Delta t(k))\}],$$

where VDTR denotes a data transfer rate variance indicator, $\Delta t(i)$ denotes a packet transfer time interval, $L(i)$ denotes a packet length of an i-th packet, $ln(\ )$ denotes a natural logarithmic function, $\Sigma$ denotes a sum in which i of all packets measured during a period of from a measurement start to a measurement end is used as an index, and $\Sigma L(k)$ and $\Sigma \Delta t(k)$ are sums in which k of all packets measured during a period of from a measurement start to a measurement end is used as an index, and are regarded as constants since "i" is not included.

2. The method for estimating an ON-OFF traffic characteristic of claim 1, wherein the data transfer rate variance indicator is computed based on the relative entropy value between
a probability distribution by a ratio of a packet transfer time interval to a measurement time which is measured in the measuring the packet length and the packet transfer time interval and
a probability distribution by a ratio of a packet transfer time interval to a measurement time in case of transferring a packet sequence which is identical to a measurement in the measuring the packet length and the packet transfer time interval at a predetermined data transfer rate by changing a time interval without changing an order.

3. The method for estimating an ON-OFF traffic characteristic of claim 1, wherein the predetermined traffic characteristic value is a ratio between an ON period and a cycle and is computed based on the data transfer rate variance indicator.

4. The method for estimating an ON" OFF traffic characteristic of claim 1, wherein the predetermined traffic characteristic value is a ratio between an ON period and a cycle and is computed based on the data transfer rate variance indicator.

5. The method for estimating an ON-OFF traffic characteristic of claim 4, wherein the ratio between the ON period and the cycle is obtained by the following equation:

$$Ton/Tc \approx \exp(-VDTR),$$

Where Ton denotes a time length of an ON period, Tc denotes a time length of a cycle, and VDTR denotes a data transfer rate variance indicator.

6. The method for estimating an ON-OFF traffic characteristic of claim 1, wherein the predetermined traffic characteristic value is a packet transfer rate of an ON period and is computed based on the data transfer rate variance indicator and an average packet transfer rate.

7. The method for estimating an ON" OFF traffic characteristic of claim 1, wherein the predetermined traffic characteristic value is a packet transfer rate of an ON period and is computed based on the data transfer rate variance indicator and an average packet transfer rate.

8. The method for estimating an ON-OFF traffic characteristic of claim 7, wherein the packet transfer rate of the ON period is obtained by the following equation:

$$Ron \approx Rav \times \exp(VDTR),$$

where Ron denotes a packet transfer rate of an ON period, Rav denotes an average packet transfer rate, and VDTR denotes a data transfer rate variance indicator.

9. The method for estimating an ON-OFF traffic characteristic of claim 1, wherein the predetermined traffic characteristic value is the number of packets transmitted during one cycle and is computed based on the data transfer rate variance indicator and a packet transfer time interval.

10. The method for estimating an ON" OFF traffic characteristic of claim 1, wherein the predetermined traffic characteristic value is the number of packets transmitted during one cycle and is computed based on the data transfer rate variance indicator and a packet transfer time interval.

11. The method for estimating an ON-OFF traffic characteristic of claim 10, wherein the number of packets transmitted during one cycle is obtained by the following equation:

$$N \approx \{(\text{standard deviation/average})^{}2\}/\{(1-\exp(-VDTR))^{}2\},$$

where N denotes the number of packets transmitted during one cycle, standard deviation denotes a standard deviation of a packet transfer time interval, average denotes an average of a packet transfer time interval, and VDTR denotes a data transfer rate variance indicator.

12. The method for estimating an ON-OFF traffic characteristic of claim 1, wherein the predetermined traffic characteristic value is a required buffer amount when a communication traffic measured in the measuring the packet length and the packet transfer time interval passes through a queue of a predetermined output rate and is computed based on the data transfer rate variance indicator, an output rate of the queue model and an average of a packet length for one cycle.

13. The method for estimating an ON" OFF traffic characteristic of claim 1, wherein the predetermined traffic characteristic value is a required buffer amount when a communication traffic measured in the measuring the packet length and the packet transfer time interval passes through a queue of a predetermined output rate and is computed based on the data transfer rate variance indicator, an output rate of the queue model and an average of a packet length for one cycle.

14. The method for estimating an ON-OFF traffic characteristic of claim 13, wherein the required buffer amount when a communication traffic measured in the measuring the packet length and the packet transfer time interval passes through the queue of a predetermined output rate is obtained by the following equation:

$$\text{Required buffer amount} \approx Lav \times \{(\text{standard deviation/average})^{}2\}/\{(1-\exp(-VDTR))^{}2\} \times \{1-(Rout/Rav) \times \exp(-VDTR)\},$$

where Lav denotes an average of a packet length for one cycle, standard deviation denotes a standard deviation of a packet transfer time interval, average denotes an average of a packet transfer time interval, Rout denotes an output rate of a queue model, Rav denotes an average packet transfer rate, and VDTR denotes a data transfer rate variance indicator.

15. The method for estimating an ON-OFF traffic characteristic of claim 1, wherein the predetermined traffic characteristic value is a required buffer amount when a communication traffic measured in the measuring the packet length and the packet transfer time interval passes through a queue in which an output rate is identical to an average packet transfer rate and is computed based on the data transfer rate variance indicator, an average packet transfer rate, and an average of a packet length for one cycle.

16. The method for estimating an ON" OFF traffic characteristic of claim 1, wherein the predetermined traffic characteristic value is a required buffer amount when a communication traffic measured in the measuring the packet length and the packet transfer time interval passes through a queue in which an output rate is identical to an average packet transfer rate and is computed based on the data transfer rate variance indicator, an average packet transfer rate, and an average of a packet length for one cycle.

17. The method for estimating an ON-OFF traffic characteristic of claim 16, wherein the required buffer amount when a communication traffic measured in the measuring the packet length and the packet transfer time interval passes through a queue in which an output rate is identical to an average packet transfer rate is obtained by the following equation:

$$\text{Required buffer amount}(Rav) \approx Lav \times \{(\text{standard deviation/average})^{**}2\}/\{1-\exp(-VDTR)\},$$

where Rav denotes an average packet transfer rate, Lav denotes an average of a packet length for one cycle, standard deviation denotes a standard deviation of a packet transfer time interval, average denotes an average of a packet transfer time interval, and VDTR denotes a data transfer rate variance indicator.

18. The method for estimating an ON-OFF traffic characteristic of claim 1, wherein the predetermined traffic characteristic value is the maximum packet number when a communication traffic measured in the measuring the packet length and the packet transfer time interval passes through a queue of a predetermined output rate and is computed based on the data transfer rate variance indicator, an output rate of the queue model, and an average packet transfer rate.

19. The method for estimating an ON" OFF traffic characteristic of claim 1, wherein the predetermined traffic characteristic value is the maximum packet number when a communication traffic measured in the measuring the packet length and the packet transfer time interval passes through a queue of a predetermined output rate and is computed based on the data transfer rate variance indicator, an output rate of the queue model, and an average packet transfer rate.

20. The method for estimating an ON-OFF traffic characteristic of claim 19, wherein the maximum packet number when a communication traffic measured in the measuring the packet length and the packet transfer time interval passes through the queue of a predetermined output rate is obtained by the following equation:

Maximum packet number≈{(standard deviation/average)2}/{(1−exp(−$VDTR$))2}×{1−($Rout$/$Rav$)×exp(−$VDTR$)}, where standard deviation denotes a standard deviation of a packet transfer time interval, average denotes an average of a packet transfer time interval, Rout denotes an output rate of a queue model, Rav denotes an average packet transfer rate, and VDTR denotes a data transfer rate variance indicator.

21. The method for estimating an ON-OFF traffic characteristic of claim 1, wherein the predetermined traffic characteristic value is the maximum packet number when a communication traffic measured in the measuring the packet length and the packet transfer time interval passes through a queue in which an output rate is identical to an average packet transfer rate and is computed based on the data transfer rate variance indicator and an average packet transfer rate.

22. The method for estimating an ON" OFF traffic characteristic of claim 1, wherein the predetermined traffic characteristic value is the maximum packet number when a communication traffic measured in the measuring the packet length and the packet transfer time interval passes through a queue in which an output rate is identical to an average packet transfer rate and is computed based on the data transfer rate variance indicator and an average packet transfer rate.

23. The method for estimating an ON-OFF traffic characteristic of claim 22, wherein the maximum packet number when a communication traffic measured in the measuring the packet length and the packet transfer time interval passes through a queue in which an output rate is identical to an average packet transfer rate is obtained by the following equation:

Maximum packet number($Rav$)≈{(standard deviation/average)**2}/{1−exp(−$VDTR$)} where standard deviation denotes a standard deviation of a packet transfer time interval, average denotes an average of a packet transfer time interval, Rav denotes an average packet transfer rate, and VDTR denotes a data transfer rate variance indicator.

24. An apparatus for estimating an ON-OFF traffic characteristic, comprising:
a measurement section which measures a packet length and a packet transfer time interval of a communication traffic;
a data transfer rate variance indicator computation section which computes a data transfer rate variance indicator based on a relative entropy value between the packet transfer time interval which is measured by the measurement section and the packet transfer time interval in case of transferring at a constant transfer rate; and
a computation section which at least approximately computes a predetermined traffic characteristic value using the data transfer rate variance indicator which is computed by the data transfer rate variance indicator computation section,
wherein the data transfer rate variance indicator is obtained by the following equation:

$VDTR = \Sigma\{L(i)/(\Sigma L(k))\} \times ln[\{L(i)/(\Sigma L(k))\}/\{\Delta t(i)/(\Sigma \Delta t(k))\}]$, where VDTR denotes a data transfer rate variance indicator, $\Delta t(i)$ denotes a packet transfer time interval, $L(i)$ denotes a packet length of an i-th packet, $ln()$ denotes a natural logarithmic function, $\Sigma$ denotes a sum in which i of all packets measured during a period of from a measurement start to a measurement end is used as an index, and $\Sigma L(k)$ and $\Sigma \Delta t(k)$ are sums in which k of all packets measured during a period of from a measurement start to a measurement end is used as an index, and are regarded as constants since "i" is not included.

25. The apparatus for estimating an ON-OFF traffic characteristic of claim 24, wherein the data transfer rate variance indicator is computed based on the relative entropy value between
a probability distribution by a ratio of a packet transfer time interval to a measurement time which is measured by the measurement section and
a probability distribution by a ratio of a packet transfer time interval to a measurement time in case of transferring a packet sequence which is identical to a measurement of the measurement section at a predetermined data transfer rate by changing a time interval without changing an order.

26. The apparatus for estimating an ON-OFF traffic characteristic of claim 24, wherein the predetermined traffic characteristic value is a ratio between an ON period and a cycle and is computed based on the data transfer rate variance indicator.

27. The apparatus for estimating an ON'OFF traffic characteristic of claim 24, wherein the predetermined traffic characteristic value is a ratio between an ON period and a cycle and is computed based on the data transfer rate variance indicator.

28. The apparatus for estimating an ON-OFF traffic characteristic of claim 27, wherein the ratio between the ON period and the cycle is obtained by the following equation:

$Ton/Tc \approx \exp(-VDTR)$, where Ton denotes a time length of an ON period, Tc denotes a time length of a cycle, and VDTR denotes a data transfer rate variance indicator.

29. The apparatus for estimating an ON-OFF traffic characteristic of claim 24, wherein the predetermined traffic characteristic value is a packet transfer rate of an ON period and is computed based on the data transfer rate variance indicator and an average packet transfer rate.

30. The apparatus for estimating an ON'OFF traffic characteristic of claim 24, wherein the predetermined traffic characteristic value is a packet transfer rate of an ON period and is computed based on the data transfer rate variance indicator and an average packet transfer rate.

31. The apparatus for estimating an ON-OFF traffic characteristic of claim 30, wherein the packet transfer rate of the ON period is obtained by the following equation:

$Ron \approx Rav \times \exp(VDTR)$, where Ron denotes a packet transfer rate of an ON period, Rav denotes an average packet transfer rate, and VDTR denotes a data transfer rate variance indicator.

32. The apparatus for estimating an ON-OFF traffic characteristic of claim 24, wherein the predetermined traffic characteristic value is the number of packets transmitted during one cycle and is computed based on the data transfer rate variance indicator and a packet transfer time interval.

33. The apparatus for estimating an ON'OFF traffic characteristic of claim 24, wherein the predetermined traffic characteristic value is the number of packets transmitted during one cycle and is computed based on the data transfer rate variance indicator and a packet transfer time interval.

34. The apparatus for estimating an ON-OFF traffic characteristic of claim 33, wherein the number of packets transmitted during one cycle is obtained by the following equation:

$$N \approx \{(\text{standard deviation/average})^{}2\}/\{(1-\exp(-VDTR))^{}2\},$$

where N denotes the number of packets transmitted during one cycle, standard deviation denotes a standard deviation of a packet transfer time interval, average denotes an average of a packet transfer time interval, and VDTR denotes a data transfer rate variance indicator.

35. The apparatus for estimating an ON-OFF traffic characteristic of claim 24, wherein the predetermined traffic characteristic value is a required buffer amount when a communication traffic measured by the measurement section passes through a queue of a predetermined output rate and is computed based on the data transfer rate variance indicator, an output rate of the queue model and an average of a packet length for one cycle.

36. The apparatus for estimating an ON'OFF traffic characteristic of claim 24, wherein the predetermined traffic characteristic value is a required buffer amount when a communication traffic measured by the measurement section passes through a queue of a predetermined output rate and is computed based on the data transfer rate variance indicator, an output rate of the queue model and an average of a packet length for one cycle.

37. The apparatus for estimating an ON-OFF traffic characteristic of claim 36, wherein the required buffer amount when a communication traffic measured by the measurement section passes through the queue of a predetermined output rate is obtained by the following equation:

$$\text{Required buffer amount} \approx Lav \times \{(\text{standard deviation/average})^{}2\}/\{(1-\exp(-VDTR))^{}2\} \times \{1-(Rout/Rav) \times \exp(-VDTR)\},$$

where Lav denotes an average of a packet length for one cycle, standard deviation denotes a standard deviation of a packet transfer time interval, average denotes an average of a packet transfer time interval, Rout denotes an output rate of a queue model, Rav denotes an average packet transfer rate, and VDTR denotes a data transfer rate variance indicator.

38. The apparatus for estimating an ON-OFF traffic characteristic of claim 24, wherein the predetermined traffic characteristic value is a required buffer amount when a communication traffic measured by the measurement section passes through a queue in which an output rate is identical to an average packet transfer rate and is computed based on the data transfer rate variance indicator, an average packet transfer rate, and an average of a packet length for one cycle.

39. The apparatus for estimating an ON'OFF traffic characteristic of claim 24, wherein the predetermined traffic characteristic value is a required buffer amount when a communication traffic measured by the measurement section passes through a queue in which an output rate is identical to an average packet transfer rate and is computed based on the data transfer rate variance indicator, an average packet transfer rate, and an average of a packet length for one cycle.

40. The apparatus for estimating an ON-OFF traffic characteristic of claim 39, wherein the required buffer amount when a communication traffic measured by the measurement section passes through a queue in which an output rate is identical to an average packet transfer rate is obtained by the following equation:

$$\text{Required buffer amount}(Rav) \approx Lav \times \{(\text{standard deviation/average})^{}2\}/\{(1-\exp(-VDTR))^{}2\} \times \{1-(Rout/Rav) \times \exp(-VDTR)\},$$

where Rav denotes an average packet transfer rate, Lav denotes an average of a packet length for one cycle, standard deviation denotes a standard deviation of a packet transfer time interval, average denotes an average of a packet transfer time interval, and VDTR denotes a data transfer rate variance indicator.

41. The apparatus for estimating an ON-OFF traffic characteristic of claim 24, wherein the predetermined traffic characteristic value is the maximum packet number when a communication traffic measured by the measurement section passes through a queue of a predetermined output rate and is computed based on the data transfer rate variance indicator, an output rate of the queue model, and an average packet transfer rate.

42. The apparatus for estimating an ON'OFF traffic characteristic of claim 24, wherein the predetermined traffic characteristic value is the maximum packet number when a communication traffic measured by the measurement section passes through a queue of a predetermined output rate and is computed based on the data transfer rate variance indicator, an output rate of the queue model, and an average packet transfer rate.

43. The apparatus for estimating an ON-OFF traffic characteristic of claim 42, wherein the maximum packet number when a communication traffic measured by the measurement section passes through the queue of a predetermined output rate is obtained by the following equation:

$$\text{Maximum packet number} \approx \{(\text{standard deviation/average})^{}2\}/\{(1-\exp(-VDTR))^{}2\} \times \{1-(Rout/Rav) \times \exp(-VDTR)\},$$

where standard deviation denotes a standard deviation of a packet transfer time interval, average denotes an average of a packet transfer time interval, Rout denotes an output rate of a queue model, Rav denotes an average packet transfer rate, and VDTR denotes a data transfer rate variance indicator.

44. The apparatus for estimating an ON-OFF traffic characteristic of claim 24, wherein the predetermined traffic characteristic value is the maximum packet number when a communication traffic measured by the measurement section passes through a queue in which an output rate is identical to an average packet transfer rate and is computed based on the data transfer rate variance indicator and an average packet transfer rate.

45. The apparatus for estimating an ON'OFF traffic characteristic of claim 24, wherein the predetermined traffic characteristic value is the maximum packet number when a communication traffic measured by the measurement section passes through a queue in which an output rate is identical to an average packet transfer rate and is computed based on the data transfer rate variance indicator and an average packet transfer rate.

46. The apparatus for estimating an ON-OFF traffic characteristic of claim 45, wherein the maximum packet number when a communication traffic measured by the measurement section passes through a queue in which an output rate is identical to an average packet transfer rate is obtained by the following equation:

$$\text{Maximum packet number}(Rav) \approx \{(\text{standard deviation/average})^{**}2\}/\{(1-\exp(-VDTR))\}$$

where standard deviation denotes a standard deviation of a packet transfer time interval, average denotes an average of a packet transfer time interval, Rav denotes an average packet transfer rate, and VDTR denotes a data transfer rate variance indicator.

47. A communication system, comprising:
the apparatus for estimating the ON-OFF traffic characteristic of claim 24 which is connected between a packet transmitting device and a packet receiving device.

48. A recording medium recording a program for estimating an ON-OFF traffic characteristic, for executing, in a computer:
measurement processing which measures a packet length and a packet transfer time interval of a communication traffic;
data transfer rate variance indicator computation processing which computes a data transfer rate variance indicator based on a relative entropy value between the packet transfer time interval which is measured by the measurement processing and the packet transfer time interval in case of transferring at a constant transfer rate; and
computation processing which at least approximately computes a predetermined traffic characteristic value using the data transfer rate variance indicator which is computed by the data transfer rate variance indicator computation processing,
wherein the data transfer rate variance indicator is obtained by the following equation:

$$VDTR = \Sigma\{L(i)/(\Sigma L(k))\} \times ln[\{L(i)/(\Sigma L(k))\}/\{\Delta t(i)/(\Sigma \Delta t(k))\}],$$

where VDTR denotes a data transfer rate variance indicator, $\Delta t(i)$ denotes a packet transfer time interval, $L(i)$ denotes a packet length of an i-th packet, $ln(\ )$ denotes a natural logarithmic function, $\Sigma$ denotes a sum in which i of all packets measured during a period of from a measurement start to a measurement end is used as an index, and $\Sigma L(k)$ and $\Sigma \Delta t(k)$ are sums in which k of all packets measured during a period of from a measurement start to a measurement end is used as an index, and are regarded as constants since "i" is not included.

49. The recording medium recording a program for estimating an ON-OFF traffic characteristic of claim 48, wherein the data transfer rate variance indicator is computed based on the relative entropy value between
a probability distribution by a ratio of a packet transfer time interval to a measurement time which is measured by the measurement processing and
a probability distribution by a ratio of a packet transfer time interval to a measurement time in case of transferring a packet sequence which is identical to a measurement of the measurement processing at a predetermined data transfer rate by changing a time interval without changing an order.

50. The recording medium recording a program for estimating an ON-OFF traffic characteristic of claim 48, wherein the predetermined traffic characteristic value is a ratio between an ON period and a cycle and is computed based on the data transfer rate variance indicator.

51. The recording medium recording a program for estimating an ON'OFF traffic characteristic of claim 48, wherein the predetermined traffic characteristic value is a ratio between an ON period and a cycle and is computed based on the data transfer rate variance indicator.

52. The recording medium recording a program for estimating an ON-OFF traffic characteristic of claim 51, wherein the ratio between the ON period and the cycle is obtained by the following equation:

$$Ton/Tc \approx exp(-VDTR),$$

where Ton denotes a time length of an ON period, Tc denotes a time length of a cycle, and VDTR denotes a data transfer rate variance indicator.

53. The recording medium recording a program for estimating an ON-OFF traffic characteristic of claim 48, wherein the predetermined traffic characteristic value is a packet transfer rate of an ON period and is computed based on the data transfer rate variance indicator and an average packet transfer rate.

54. The recording medium recording a program for estimating an ON'OFF traffic characteristic of claim 48, wherein the predetermined traffic characteristic value is a packet transfer rate of an ON period and is computed based on the data transfer rate variance indicator and an average packet transfer rate.

55. The recording medium recording a program for estimating an ON-OFF traffic characteristic of claim 54, wherein the packet transfer rate of the ON period is obtained by the following equation:

$$Ron \approx Rav \times exp(VDTR),$$

where Ron denotes a packet transfer rate of an ON period, Rav denotes an average packet transfer rate, and VDTR denotes a data transfer rate variance indicator.

56. The recording medium recording a program for estimating an ON-OFF traffic characteristic of claim 48, wherein the predetermined traffic characteristic value is the number of packets transmitted during one cycle and is computed based on the data transfer rate variance indicator and a packet transfer time interval.

57. The recording medium recording a program for estimating an ON'OFF traffic characteristic of claim 48, wherein the predetermined traffic characteristic value is the number of packets transmitted during one cycle and is computed based on the data transfer rate variance indicator and a packet transfer time interval.

58. The recording medium recording a program for estimating an ON-OFF traffic characteristic of claim 57, wherein the number of packets transmitted during one cycle is obtained by the following equation:

$$N \approx \{(standard\ deviation/average)2\}/\{(1-exp(-VDTR))2\},$$

where N denotes the number of packets transmitted during one cycle, standard deviation denotes a standard deviation of a packet transfer time interval, average denotes an average of a packet transfer time interval, and VDTR denotes a data transfer rate variance indicator.

59. The recording medium recording a program for estimating an ON-OFF traffic characteristic of claim 48, wherein the predetermined traffic characteristic value is a required buffer amount when a communication traffic measured by the measurement processing passes through a queue of a predetermined output rate and is computed based on the data transfer rate variance indicator, an output rate of the queue model and an average packet length for one cycle.

60. The recording medium recording a program for estimating an ON'OFF traffic characteristic of claim 48, wherein the predetermined traffic characteristic value is a required buffer amount when a communication traffic measured by the measurement processing passes through a queue of a predetermined output rate and is computed based on the data transfer rate variance indicator, an output rate of the queue model and an average of a packet length for one cycle.

61. The recording medium recording a program for estimating an ON-OFF traffic characteristic of claim 60, wherein the required buffer amount when a communication traffic measured by the measurement processing passes through the queue of a predetermined output rate is obtained by the following equation:

$$\text{Required buffer amount} \approx Lav \times \{(\text{standard deviation}/\text{average})^{}2\}/\{(1-\exp(-VDTR))^{}2\} \times \{1-(Rout/Rav) \times \exp(-VDTR)\},$$

where Lav denotes an average of a packet length for one cycle, standard deviation denotes a standard deviation of a packet transfer time interval, average denotes an average of a packet transfer time interval, Rout denotes an output rate of a queue model, Rav denotes an average packet transfer rate, and VDTR denotes a data transfer rate variance indicator.

62. The recording medium recording a program for estimating an ON-OFF traffic characteristic of claim 48, wherein the predetermined traffic characteristic value is a required buffer amount when a communication traffic measured by the measurement processing passes through a queue in which an output rate is identical to an average packet transfer rate and is computed based on the data transfer rate variance indicator, an average packet transfer rate, and an average of a packet length for one cycle.

63. The recording medium recording a program for estimating an ON'OFF traffic characteristic of claim 48, wherein the predetermined traffic characteristic value is a required buffer amount when a communication traffic measured by the measurement processing passes through a queue in which an output rate is identical to an average packet transfer rate and is computed based on the data transfer rate variance indicator, an average packet transfer rate, and an average of a packet length for one cycle.

64. The recording medium recording a program for estimating an ON-OFF traffic characteristic of claim 63, wherein the required buffer amount when a communication traffic measured by the measurement processing passes through a queue in which an output rate is identical to an average packet transfer rate is obtained by the following equation:

$$\text{Required buffer amount}(Rav) \approx Lav \times \{(\text{standard deviation}/\text{average})^{**}2\}/\{1-\exp(-VDTR)\},$$

where Rav denotes an average packet transfer rate, Lav denotes an average of a packet length for one cycle, standard deviation denotes a standard deviation of a packet transfer time interval, average denotes an average of a packet transfer time interval, and VDTR denotes a data transfer rate variance indicator.

65. The recording medium recording a program for estimating an ON-OFF traffic characteristic of claim 48, wherein the predetermined traffic characteristic value is the maximum packet number when a communication traffic measured by the measurement processing passes through a queue of a predetermined output rate and is computed based on the data transfer rate variance indicator, an output rate of the queue model, and an average packet transfer rate.

66. The recording medium recording a program for estimating an ON'OFF traffic characteristic of claim 48, wherein the predetermined traffic characteristic value is the maximum packet number when a communication traffic measured by the measurement processing passes through a queue of a predetermined output rate and is computed based on the data transfer rate variance indicator, an output rate of the queue model, and an average packet transfer rate.

67. The recording medium recording a program for estimating an ON-OFF traffic characteristic of claim 66, wherein the maximum packet number when a communication traffic measured by the measurement processing passes through the queue of a predetermined output rate is obtained by the following equation:

$$\text{Maximum packet number} \approx \{(\text{standard deviation}/\text{average})^{}2\}/\{(1-\exp(-VDTR))^{}2\} \times \{1-(Rout/Rav) \times \exp(-VDTR)\},$$

where standard deviation denotes a standard deviation of a packet transfer time interval, average denotes an average of a packet transfer time interval, Rout denotes an output rate of a queue model, Rav denotes an average packet transfer rate, and VDTR denotes a data transfer rate variance indicator.

68. The recording medium recording a program for estimating an ON-OFF traffic characteristic of claim 48, wherein the predetermined traffic characteristic value is the maximum packet number when a communication traffic measured by the measurement processing passes through a queue in which an output rate is identical to an average packet transfer rate and is computed based on the data transfer rate variance indicator and an average packet transfer rate.

69. The recording medium recording a program for estimating an ON'OFF traffic characteristic of claim 48, wherein the predetermined traffic characteristic value is the maximum packet number when a communication traffic measured by the measurement processing passes through a queue in which an output rate is identical to an average packet transfer rate and is computed based on the data transfer rate variance indicator and an average packet transfer rate.

70. The recording medium recording a program for estimating an ON-OFF traffic characteristic of claim 69, wherein the maximum packet number when a communication traffic measured by the measurement processing passes through a queue in which an output rate is identical to an average packet transfer rate is obtained by the following equation:

$$\text{Maximum packet number}(Rav) \approx \{(\text{standard deviation}/\text{average})^{**}2\}/\{(1-\exp(-VDTR)\}$$

where standard deviation denotes a standard deviation of a packet transfer time interval, average denotes an average of a packet transfer time interval, Rav denotes an average packet transfer rate, and VDTR denotes a data transfer rate variance indicator.

* * * * *